US011471856B2

(12) United States Patent
Finsy et al.

(10) Patent No.: US 11,471,856 B2
(45) Date of Patent: Oct. 18, 2022

(54) ADVANCED POROUS CARBONACEOUS MATERIALS AND METHODS TO PREPARE THEM

(71) Applicant: SOLVAY SA, Brussels (BE)

(72) Inventors: Vincent Finsy, Halle (BE); Eric Pierre Dubois, Wasseiges (BE); Yves Vanderveken, Leuven (BE); Agnès Chapotot, Dole (FR)

(73) Assignee: Solvay SA, Brussels (BE)

( * ) Notice: Subject to any disclaimer, the term of this patent is extended or adjusted under 35 U.S.C. 154(b) by 740 days.

(21) Appl. No.: 16/465,318

(22) PCT Filed: Nov. 17, 2017

(86) PCT No.: PCT/EP2017/079648
§ 371 (c)(1),
(2) Date: May 30, 2019

(87) PCT Pub. No.: WO2018/099739
PCT Pub. Date: Jun. 7, 2018

(65) Prior Publication Data
US 2019/0388872 A1 Dec. 26, 2019

(30) Foreign Application Priority Data

Nov. 30, 2016 (EP) .................... 16201571

(51) Int. Cl.
| | |
|---|---|
| *B01J 20/20* | (2006.01) |
| *B01D 53/04* | (2006.01) |
| *B01D 53/02* | (2006.01) |
| *B01J 20/28* | (2006.01) |
| *B01J 20/30* | (2006.01) |

(52) U.S. Cl.
CPC .............. *B01J 20/20* (2013.01); *B01D 53/02* (2013.01); *B01D 53/04* (2013.01); *B01J 20/28004* (2013.01); *B01J 20/28045* (2013.01); *B01J 20/28064* (2013.01); *B01J 20/28071* (2013.01); *B01J 20/3007* (2013.01); *B01J 20/3078* (2013.01); *B01D 2253/102* (2013.01); *B01D 2253/304* (2013.01); *B01D 2253/308* (2013.01); *B01D 2253/311* (2013.01); *B01D 2253/3425* (2013.01); *B01D 2257/504* (2013.01)

(58) Field of Classification Search
CPC .. B01D 53/02; B01D 53/04; B01D 2253/102; B01D 2253/304; B01D 2253/308; B01D 2253/311; B01D 2253/3425; B01D 2257/504; B01D 2258/05; B01D 2258/06; B01J 2220/4812; Y02C 20/40

USPC ..... 96/108; 95/139, 903; 502/400, 416, 418, 502/437; 428/116
See application file for complete search history.

(56) References Cited

U.S. PATENT DOCUMENTS

| | | | |
|---|---|---|---|
| 2,609,150 A | 9/1952 | Bludeau | |
| 2,968,651 A | 1/1961 | Friedrich et al. | |
| 5,292,706 A | 3/1994 | Chang et al. | |
| 6,284,705 B1 | 9/2001 | Park et al. | |
| 6,294,501 B1 | 9/2001 | Chang | |
| 7,316,323 B2 * | 1/2008 | Collias | C02F 1/283 210/90 |
| 8,615,812 B2 * | 12/2013 | Wojtowicz | C04B 35/63476 296/187.02 |
| 9,283,512 B2 * | 3/2016 | Carruthers | B01J 20/3078 |
| 2002/0020292 A1 * | 2/2002 | Wojtowicz | B01D 53/02 96/108 |
| 2002/0025290 A1 * | 2/2002 | Chang | B01J 20/28004 423/418 |
| 2003/0217967 A1 * | 11/2003 | Mitchell | B01J 20/30 423/466 |
| 2004/0107838 A1 | 6/2004 | Carruthers | |
| 2011/0139701 A1 * | 6/2011 | Pearks | B01J 20/3272 502/402 |
| 2012/0180660 A1 | 7/2012 | Wilson et al. | |
| 2013/0298769 A1 | 11/2013 | Petruska et al. | |
| 2016/0003680 A1 | 1/2016 | Kim et al. | |

FOREIGN PATENT DOCUMENTS

| | | |
|---|---|---|
| WO | 2015081317 A2 | 6/2015 |
| WO | 2015109381 A1 | 7/2015 |

OTHER PUBLICATIONS

Mangano, E. et al., "Analysis and Interpretation of Zero Length Column Response Curves", Chemie Ingenieur Technik, 2013, vol. 85, No. 11, pp. 1714-1718.
Alam, M. M. et al., "Facile synthesis of dual micro/macroporous carbonaceous foams by templating in highly concentraled water-in-oil emulsions", Microporous and Mesoporous Materials (2013) vol. 182, pp. 102-108.
Tiwary, C.S. et al., "Chemical-free graphene by unzipping carbon nanotubes using cryo-milling", Carbon (2015) vol. 89, pp. 217-224.
Lee, J. et al., "Short carbon nanotubes produced by cryogenic crushing", Carbon (2006) vol. 44, Issue 14, pp. 2984-2989.

* cited by examiner

*Primary Examiner* — Frank M Lawrence, Jr.
(74) *Attorney, Agent, or Firm* — Osha Bergman Watanabe & Burton LLP

(57) ABSTRACT

The present invention concerns porous carbonaceous particles having pores including micropores and macropores, having a mean diameter, determined by laser diffraction, ranging from 15 to 100 μm and porous carbonaceous monoliths comprising aggregates of said carbonaceous particles.

7 Claims, 5 Drawing Sheets

ADVANCED POROUS CARBONACEOUS MATERIALS AND METHODS TO PREPARE THEM

This application is a U.S. national stage entry under 35 U.S.C. § 371 of International Application No. PCT/EP2017/079648 filed Nov. 17, 2017, which claims priority to European application No. 16201571.3 filed on Nov. 30, 2016. The entire contents of these applications are explicitly incorporated herein by this reference.

The present invention concerns porous carbonaceous particles and porous particles comprising a vinylidene chloride polymer as well as processes for manufacturing such particles. It also concerns a porous carbonaceous monolith, which may have or not a honeycomb structure, having pores including micropores and macropores and processes for manufacturing such monolith. The present invention pertains to the manufacture of a shaped body comprising aggregates of particles comprising a vinylidene chloride polymer. It finally pertains to the use of a porous carbonaceous monolith for extracting $CO_2$ from a gas composition by selectively adsorbing $CO_2$ gas.

It is generally admitted that the use of solid adsorbents for purification can offer an economic, energetic and ecological advantage over conventional processes such as distillation, liquid based absorption processes or extraction processes. A few examples of separation technologies include pressure swing adsorption (PSA), temperature swing adsorption (TSA), vacuum swing adsorption (VSA), electric swing adsorption (ESA) and combination of vacuum and temperature swing adsorption (VTSA) or combination of vacuum and pressure swing adsorption (VPSA). Although both PSA and TSA are commercially available technologies and are widely used in the industry, the application of adsorption technologies in processes where very large feed stream volumes need to be treated still remains challenging. This is particularly true for the capture and purification of $CO_2$ from $CO_2$ containing feed streams such as flue gas and natural gas.

TSA involves a first step for the selective adsorption of one component at low temperature and a second step where a temperature rise of the adsorbent is responsible for the increase of the mole fraction of the adsorbed component in the gas phase, hence purifying the product stream. In order to render TSA process viable, a rapid temperature-swing adsorption (RTSA) process, where the adsorbent can be rapidly cycled through adsorption, regeneration, and cooling steps, is required.

The assembly of adsorbents into high aspect ratio structures such as hollow fibers, laminates and honeycombs, wherein the thin wall dimensions allow for a rapid heat and mass transport, are promising. Generally, structured adsorbents, like monoliths, with interconnected and branched macroporous channels are superior in performance compared to conventional beads and granules.

Porous carbon has been used as adsorbent in many applications such as water treatment, air purification or gas storage.

In the field of porous carbonaceous materials for gas adsorption, more particularly for $CO_2$ adsorption, it is well known that the amount of $CO_2$ adsorbed is, for a high proportion, due to the presence of micropores.

Another important parameter is the $CO_2$ diffusion through the porous network of the particles.

Moreover, in order to ensure an efficient mass transfer of gas, which is a key parameter for high adsorption and desorption kinetics in fast cycling process, a highly connected macroporous network is required to supply the microporous network. Indeed, in the past, lots of efforts have been devoted to create hierarchical porous materials. In general only mesopores have been introduced into the microporous material and it has been demonstrated that the presence of these mesopores did not increase the adsorption and desorption kinetics sufficiently for using the material in rapid adsorption/desorption processes.

Another important aspect for high mass transfer is the assembly of adsorbents into high aspect ratio structures. For this reason monoliths and honeycomb are very desirable. Even more desirable are monolith and/or honeycomb structures having a low wall thickness. Indeed, a low wall thickness should give a clear advantage for high mass and heat transfer.

Carbon monoliths are generally manufactured by mixing porous carbon powders with a binder and by pressing the resulting mixture into appropriate shape. As a matter of example, U.S. Pat. No. 6,284,705 pertains to carbonaceous honeycomb monoliths made by extrusion of a mixture of activated carbon particles with an organic binder and ceramic forming materials. To these mixture is optionally added, stabilizers, processing agents . . . . After extrusion, the monolith in brought to high temperature to induce carbonization of the organic binder and formation of a ceramic coating encapsulating the porous carbon particles. The binding components used in this pathway may block the access to the porosity and are responsible for the dilution of the carbon content in the resulting monolith. Especially in the case of ceramic material, the capacity to absorb gas, which is essential for separation application, is thereby diluted.

Carbonization under inert atmosphere of various precursors has been considered to produce efficient carbonaceous materials. Generally, carbonization is followed by an activation step in an oxidative atmosphere to enhance the surface area so that the materials can be used as porous carbon.

The carbonization of vinylidene chloride or fluoride polymers is an advantageous process because the thermal decomposition of such polymers is triggered without any need of catalytic input and because the resulting carbonaceous materials does not required any activation step to generate desired porosity. While both vinylidene chloride and fluoride polymers may be good candidates as precursor of porous carbonaceous structure, vinylidene chloride is generally preferred as its decomposition requires less demanding temperatures than vinylidene fluoride does and as its thermal decomposition generates hydrochloric acid which is easier to handle than hydrogen fluoride.

Vinylidene chloride polymer as precursor of porous carbonaceous material is well documented. However, only few documents deal with the manufacture of carbon monolith starting from such polymer. Among them, WO2015/109381 discloses the manufacture of polyvinylidene chloride (PVDC) monolith by mixing of PVDC particles with a PVDC latex followed by drying under vacuum at relatively low temperature. As a result, the dried latex ensures the cohesion of the PVDC particles in the monolith acting as a binder for the particles. The PVDC monolith is then heated by increasing at a slow rate the temperature and thus is stepwise pyrolyzed under inert atmosphere in a mold to give a carbonaceous material. This method has the advantage that the binder and the particles are of the same chemical nature and that consequently, they shall follow the same degradation pathway to give the carbonaceous material. However, there is a good chance that said binder blocks the access to the porosity of the resulting carbonaceous monolith. Moreover, the diameter of the particles is too large to allow manufacturing of monoliths with thin walls.

US 2013/0298769 discloses the use of carbonaceous materials obtained from PVDC for manufacturing devices suitable for selective $CO_2$ capture. For this invention, PVDC is pyrolized under the form of discrete particles or in the form of a monolith. Optionally, an activation step is performed to get the desired porous structure. The exact procedure used to prepare the porous carbonaceous materials is not clearly described and nothing is told in this document about the macroporosity of the monoliths. Besides, nothing is told about the diameter of the discrete particles or about the thickness of the walls of the monoliths.

In US 2004/0107838, PVDC particles are pressure molded before being carbonized to give a porous monolith useful for the manufacture of devices capable of gas/fluid storage. According to the procedure, the pressure which is used is exceeding 600 bars, which is detrimental to the macroporosity of the final porous carbonaceous monolith. Furthermore, US 2004/0107838 is silent about the thickness of the walls of the monoliths.

The manufacture of carbonaceous monoliths having low wall thickness requires producing porous particles comprising a vinylidene chloride polymer, having a mean diameter below said wall thickness.

U.S. Pat. No. 2,609,150 describes a method for the mechanical pulverization of refrigerated plastics, PVDC being one among them. Pieces of materials are cooled with a spray of liquid refrigerant and their size is reduced by impact type pulverizing mill. The method does not describe the porosity of these pieces and the document is silent about the porosity of the resulting powders. Nothing is told about the transformation of PVDC particles into porous carbonaceous material.

U.S. Pat. No. 2,968,651 describes an aqueous process for preparing vinylidene chloride copolymers of controlled particle size. When small amounts of methyl hydroxypropyl cellulose, typically from 0.01 wt % to 0.06 wt % based on the weight of monomers, particles with a diameter mostly above 150 µm are obtained. Nothing is told about the way to obtain smaller particle sizes. The document is silent about the porosity of the particles; it is also silent about the transformation of the vinylidene chloride polymer particles into porous carbonaceous material.

Finally, US 2002/0025290 and U.S. Pat. No. 6,294,501 describe the synthesis of PVDC particles via free radical polymerization in suspension of vinylidene chloride. The grinding in the presence of ice of these particles gives new particles which are further shaped into pellets. Said pellets are then pyrolyzed to give porous carbonaceous objects which have dimensions in the range of several millimeters. The particles sizes of the PVDC obtained after polymerization are ranging from 20 to 400 µm or from 200 to 800 µm depending on the reaction conditions. These particles sizes are too large for some applications such as the manufacture of carbonaceous monoliths having low wall thickness. The particles size of the PVDC obtained after grinding is obviously reduced.

However, according to the particle size distributions diagrams provided in US 2002/0025290, the ground PVDC comprises several populations of particles in term of size. The presence of too large particles and, simultaneously or not, of too fine particles can be detrimental for some applications. Moreover, a large particle size distribution of PVDC particles should be undoubtedly responsible for a large particle size distribution of carbonaceous particles resulting from their pyrolysis. Both documents are silent about the size, the microporosity and the macroporosity of the carbonaceous particles and about the macroporosity of the carbonaceous objects.

According to all the above, the applicant has identified some needs in the domain of solid carbonaceous adsorbents for purification.

There is a need for the development of adsorption and desorption processes operating in fast cycles.

There is a need for the development of adsorbents particles and of monolithic adsorbent structures suitable for these processes.

There is a need for a carbonaceous monolith structure comprising particles, said particles exhibiting a microporosity for improved selective adsorption of gas and a macroporosity for enhanced mass transfer of said gas and/or of gaseous mixture comprising said gas.

There is a need for porous carbonaceous monoliths and honeycomb monoliths having thin walls to improve the aspect ratio of these structures thereby allowing rapid heat and mass transports in separation applications.

The prerequisite to fulfill all these needs and others is the development of porous carbonaceous particles having low mean diameter, having high $CO_2$ diffusion capability and having selective $CO_2$ capacity, that are suitable to prepare monoliths having low wall thickness and similar behavior towards $CO_2$.

This prerequisite, is advantageously met by porous carbonaceous particles (I) having pores including micropores and macropores, said porous carbonaceous particles (I) having a mean diameter, determined by laser diffraction, ranging from 15 to 100 µm.

Figure 1:
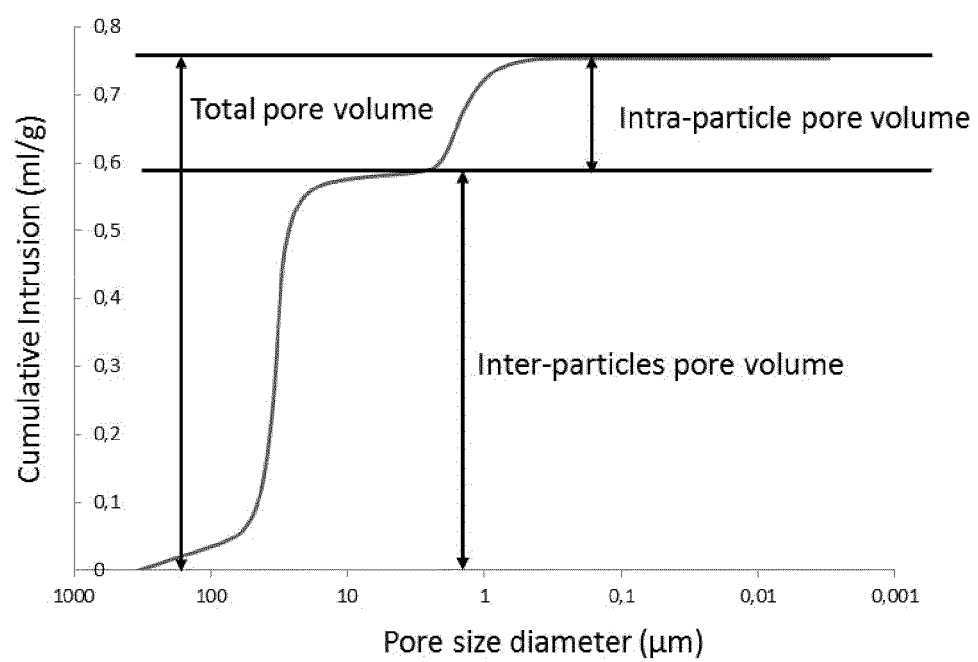
FIG. 1 is a plot showing the cumulative intrusion as a function of the pore size diameter.

As early knew by the skilled person, in the context of gas adsorption, more particularly of $CO_2$ adsorption using materials obtained by pyrolysis of polymers, which is the context of the present invention, carbonaceous material is understood as a material essentially or totally composed of carbon i.e. as a material which is substantially free or completely free of any other element than carbon.

Accordingly, the carbonaceous particles according to the invention are generally composed of at least 90 wt. %, preferably of at least 95 wt. %, more preferably of at least 98 wt. % and even more preferably of at least 99 wt. % of carbon.

Advantageously, at least 80 vol. % of said particles (I) have a diameter, determined by laser diffraction analysis, ranging from 5 to 150 µm, preferably at least 85 vol. % and more preferably at least 90 vol. %.

Generally, at least 65 vol. % of said particles (I) have a diameter ranging from 5 to 120 μm, preferably at least 70 vol. %, more preferably at least 75 vol. % and even more preferably at least 80 vol. %.

Besides, the span of the particles (I) is advantageously of at most 2.5. Preferably, it is of at most 2.2; more preferably, it is of at most 1.5; still more preferably, it is of at most 1.

The particle size distribution of carbon (C) samples is determined by laser diffraction with the Beckman Coulter LS230 equipment. This instrument allows measuring the size distribution of suspended particles in a liquid between 0.04 and 2000 μm. The liquid used for C samples is 2-propanol. The powder is suspended in 2-propanol and manually shaken prior to being fed into the instrument. Laser diffraction provides particle size distribution by measuring the angular variation in intensity of light scattered as a laser beam (wavelength=750 nm) passes through a dispersed particulate sample. Large particles scatter light at small angles relative to the laser beam and small particles scatter light at larger angles. The angular scattering intensity data is then analyzed to calculate the size of the particles responsible for creating the scattering pattern, using the Fraunhofer diffraction theory in the case of C samples. The particle size is reported as a volume equivalent sphere diameter. Three measurements (90 sec) are successively recorded and, if there is no major change between these three measurements, the result of the third analysis is reported. The reported results are the volume-weighted particle size distribution (volume %, histogram and cumulative curve), the mean and the median (D50) diameters. The mean diameter D(50) is the size in microns at which 50% of the sample is smaller and 50% is larger. If necessary, in order to break some aggregates of particles, internal ultrasonic treatment (1 min) is applied to the suspension into the equipment. For each sample a span may be calculated applying:

$$\text{span} = \frac{D(90) - D(10)}{D(50)}$$

wherein D(10) is the size, on the cumulative curve in volume of the distribution, at which 10% of the particles are smaller and D(90) is the size at which 90% of the particles are smaller.

The narrower the distribution, the smaller the span becomes. While for gas adsorption, it is well known that the presence of micropores is required, a highly connected macroporous network is highly desirable to supply the microporous network and to ensure an efficient mass transfer of gas. According to the definitions provided by the International Union of Pure and Applied Chemistry (IUPAC), micropores have a width below 2 nm, while the mesopores have a width ranging from 2 nm to 50 nm and the macropores a width above 50 nm.

Mercury porosimetry is used to determine macroporous characteristics of the particles (I). Measurements are performed with a Micromeritics Autopore 9520 porosimeter n° 10. Measurement starts at vacuum up to 2 bars, followed by a measurement from 1 to 2000 bars. The sample size of the product is selected considering the measurement range of the dilatometers and in order to consume 30-50% of the capillary volume (about 500-700 mg). Type CD3P 35 ml volume powder dilatometers are used. Samples are dried at 150° C. in vacuum and quickly transferred to the dilatometer, which is then closed. Afterwards, vacuum is pulled until less than 1 mbar for 1 h. Calculations are performed with a contact angle 130° and a surface tension of 485 Dyne/cm and the accurate Hg temperature dependent density at around 25° C.

The applicant has found that the carbonaceous particles (I) according to the invention have macropores having a mean diameter, measured by Hg porosimetry, advantageously ranging from 0.1 μm to 10 μm, more advantageously from 0.5 μm to 8 μm and even more advantageously from 0.8 μm to 3 μm.

Preferably, at least 75 vol. % of the macropores have a diameter ranging from 0.1 μm to 10 μm, more preferably at least 80 vol. % and even more preferably at least 85 vol. %.

Good results can be obtained when the macropore volume of the particles (I), measured by Hg porosimetry, is of at least 0.05 cm$^3$/g, preferably of at least 0.10 cm$^3$/g, more preferably of at least 0.20 cm$^3$/g and even more preferably of at least 0.25 cm$^3$/g. Besides, the macropore volume of the particles (I) generally does not exceed 0.5 cm$^3$/g.

The porous carbonaceous particles (I) according to the invention are presenting a microporosity. Microporosity is determined by $N_2$ porosimetry. The $N_2$ adsorption isotherm is determined using an ASAP 2020 Micromeritics equipment. The specific surface area ($S_{BET}$) is determined according to the ISO 9277:2010 norm (Determination of the specific surface area of solids by gas adsorption—BET method—Annex C: Surface area of microporous materials). The relative pressure, $P/P_0$, region in which the BET model has been applied is chosen in such a way that the C constant has a positive value. The pore size and pore size distribution is calculated using the Density Functional Theory, assuming slit like pores (Carbon slit pores by DFT, regularization 0.003).

In order to ensure an efficient gas adsorption the applicant has found advantageous that the particles (I) according to the invention have a BET surface area of at least 800 m$^2$/g, more advantageous of at least 900 m$^2$/g and even more advantageous of at least 1000 m$^2$/g.

Suitable particles (I) have a micropore volume, measured by $N_2$ adsorption, generally of at least 0.15 cm$^3$/g, preferably of at least 0.25 cm$^3$/g, more preferably of at least 0.30 cm$^3$/g and even more preferably of at least 0.35 cm$^3$/g. Besides, particles (I) have a micropore volume which does not exceed 0.8 cm$^3$/g.

The particles according to the invention are suitable to adsorb selectively $CO_2$. The dynamic and selective $CO_2$ capacity of porous carbonaceous particles (I) may be determined by experiments wherein a gas stream containing $CO_2$ and $N_2$ (15/85 by volume) is fed to a sample at constant flow rate. The flow rates of all the pure gasses are regulated by mass flow controllers. The sample outlet is connected to a mass spectrometer, measuring on-line the Ar and $CO_2$ concentration over the whole duration of the experiment. Prior to each experiment, the samples are activated in a pure $N_2$ stream (equal flow rate of the separation experiment) at ambient temperature or at 120° C. The particles are dried overnight under vacuum at 110° C. before installation in the experimental setup. All separation experiments are performed at room temperature (about 21° C.) and total flow rates of 50 Nml/min. In order to determine the system dead time, a tracer gas steam (5 Nml/min of Ar), is added to the $CO_2/N_2$ gas steam. Experiments on particles are performed using a column with a length of about 10 cm and an internal diameter of 0.6 cm, packed with 0.5 to 0.9 g of adsorbent.

The selective $CO_2$ capacity, $Q_{CO2}$, is calculated by integration of the experimental curves $$Q_{CO_2} = \frac{1}{M_{sample}} \int_{t=o}^{tend} (q'_0 - q'_t) dt$$

With $q_0'$ and $q_t'$ being respectively the mass flow at the column inlet at time zero and column outlet at time t. Time zero is experimentally determined by injecting a non-adsorbing tracer flow (Ar) in the feed stream. Time zero is chosen as the time at which the Ar experimental curve reaches the half of its maximum height.

The carbonaceous particles (I) according to the invention have a selective $CO_2$ capacity $Q_{CO2}$ generally of at least 25 mg/g, advantageously of at least 28 mg/g and more advantageously of at least 30 mg/g.

$CO_2$ diffusivity is determined onto porous carbonaceous particles with the zero length column chromatography method, described by Bandani and Rutven in Analysis and Interpretation of Zero Length Column Response Curve, Chemie Ingenieur Technik, 2013. 85(11): p. 1714-1718. In this method, diffusivity of a sorbate in a porous media is determined by desorption of this sorbate from a previously equilibrated sample of adsorbent into an inert carrier stream.

A small sample of the porous carbonaceous particles (3-5 mg, immobilized in between 2 metal frits inside a ⅛ inch Swagelock union) is saturated with a dilute gas stream of $CO_2$ in He (12/88) at room temperature and constant flow rate. The gas mixture is in situ generated by mixing pure $CO_2$ and He gas streams. The flow rates are controlled by mass flow controllers. Prior to saturation, the samples are activated for 10 minutes at 150° C. in He (15 ml/min). At time 0, the column is flushed with the inert carrier gas (He) at constant flow rate. At the column outlet, the $CO_2$ concentration is measured with a mass spectrometer.

The effective particle diffusivity, $D_{e,p}$, can be calculated from the linear fitting of the long term asymptote of the desorption curve (ln c/co vs t) with following equation:

$$\ln\left(\frac{c}{c_0}\right) = \ln\left[\frac{2L}{\beta_1^2 + L(L-1)}\right] - \beta_1^2 \frac{D_{e,p} t}{R^2} \quad (1)$$

with c and $c_o$ the $CO_2$ concentration at time t and zero respectively. R is the particle radius. $\beta_1^2$ and L are constant.

L is defined as the ratio between the washout rate of the system and the diffusional time constant:

$$L = \frac{FR^2}{3KV_s D_{e,p}} \quad (2)$$

With F, K and $V_s$ being respectively the purge flow rate, a dimensionless equilibrium constant and the adsorbent volume.

L is determined by the intercept of the desorption curve (ln c/co vs t) and for high L (L>10), $\beta_1^2$ is always approximately equal to π. The fitting regime of the long time asymptote is −5 and −7 or −6 and −8 ln(C/Co).

In order to assure the system is under kinetic control and as such the validity of equation (1), the desorption curve (ln(C/Co) vs Ft, wherein Ft is the elution volume in ml at instant t) is measured with different flow rates (64, 118 and 202 ml/min). When the curves converge, the system is in equilibrium. When the curves diverge, the system is under kinetic control. Equation (1) is only valid when the system is under kinetic control.

Generally, the $CO_2$ diffusivity or diffusion constant of particles (I) is at least $1.10^{-12}$ m²/s, advantageously at least $3.10^{-12}$ m²/s, more advantageously $5.10^{-12}$ m²/s and even more advantageously $7.10^{-12}$ m²/s. Besides, the $CO_2$ diffusivity is usually at most $5.10^{-10}$ m²/s.

In some embodiments, the porous particles (I) have a mean aspect ratio ranging from 1.4 to 1, in some preferred embodiments from 1.2 to 1 and in some more preferred embodiments from 1.1 to 1. The aspect ratio can be determined by method well known by the skilled person. Just for the sake of example it can be determined by SEM image analysis. The aspect ratio of a particle corresponds to the ratio of its maximum Feret diameter to its perpendicular Feret diameter and, accordingly, when the particle is spherical it is equal to 1.

It is another object of the invention to propose a process for reducing the size of porous carbonaceous particles (II) having pores including micropores and macropores, said particles (II) having a mean diameter, determined by laser diffraction analysis, ranging from 150 µm to 800 µm, said process comprising the steps of:
  cryogenically freezing the particles (II),
  grinding the frozen particles thereby obtaining particles of reduced size.

As a matter of example, the particles (II) may be frozen by spraying of a cryogenic fluid. The cryogenic fluid is preferably liquid helium, liquid nitrogen or mixtures thereof. It is more preferably liquid nitrogen.

Grinding of the frozen particle (II) may be conducted in the presence or the absence of a media.

Grinding of the frozen particles (II) in the presence of a media is preferably conducted in a ball mill but any other grinding device operating in the presence of a media such as bead mill, attritor mill, sand mill, horizontal mill, vertical mill and vibratory mill may be used.

Media-less grinding of the frozen particles (II) is preferably conducted in a hammer but any other media-less grinding device such as jaw crushers, jet mills or microfluidizers may be used.

Grinding of the frozen particles (II) is preferably conducted in the presence of a media.

In a preferred embodiment, the obtained particles of reduced size are the particles (I) as previously described.

It is an object of the invention to disclose porous particles (III) that may be used as precursor particles for the manufacture of particles (I) by carbonization.

In some embodiments, the porous particles (III) have a mean aspect ratio ranging from 1.4 to 1, in some preferred embodiments from 1.2 to 1 and in some more preferred embodiments from 1.1 to 1. Accordingly, the invention also pertains to porous particles (III) comprising at least one vinylidene chloride polymer having a melting point, said particles having macropores, a mean diameter, determined by laser diffraction analysis, generally ranging from 20 to 140 µm and a span of at most 2. Preferably, particles (III) have a mean diameter ranging from 40 to 120 µm and more preferably ranging from 50 to 100 µm.

Besides, the span of the particles (III) is advantageously of at most 2. Preferably, it is of at most 1.5; more preferably, it is of at most 1.2; still more preferably, it is of at most 1.

The applicant has found advantageous that, at least 80 vol. % of said particles (III) have a diameter, determined by laser diffraction analysis, ranging from 5 to 200 µm, preferably at least 85 vol. % and more preferably at least 90 vol. %.

Good results can be obtained when at least 65 vol. % of said particles (III) have a diameter, determined by laser diffraction analysis, ranging from 5 to 160 μm, preferably at least 70 vol. % and more preferably at least 75 vol. %.

The macroporosity of particles (III) according to the invention is a key feature to anticipate the macroporosity of the carbonaceous particles that will result from their carbonization.

Generally at least 70 vol. % of the macropores of particles (III) have a diameter, measured by Hg porosimetry, ranging from 0.01 μm to 10 μm, preferably at least 75 vol. % and more preferably of at least 80 vol. %.

Good results are obtained when the macropore volume of particles (III) measured by Hg porosimetry is of at least 0.05 $cm^3/g$, preferably of at least 0.08 $cm^3/g$, more preferably of at least 0.15 $cm^3/g$ and even more preferably of at least 0.2 $cm^3/g$. Besides, the macropore volume of particles (III) generally does not exceed 0.5 $cm^3/g$.

The porosity of the particles (III), comprising a vinylidene chloride polymer, may also characterized by the amount of a plasticizer absorbed by said polymer. For the particles comprising vinylidene chloride polymer, the porosity may be characterized by the amount of di-iso-nonylphtalate (DINP) absorbed expressed in wt. %. For this purpose, the particles are transferred in a stainless steel centrifugation tube with conical bottom (90°), containing a 0.8 mm opening at the bottom and a large excess (about twice the mass of the sample) of di-isononyl-phtalate (DINP) is added. After 15 minutes of absorption at room temperature, the DINP in excess is removed by centrifugation at 3200 g for 30 minutes. The amount of DINP absorbed by the particles is expressed in weight percent of the total weight of the particles sample introduced in the centrifugation tube.

Generally the DINP absorption by the particles (III) is at least 5 wt. %, preferably at least 8 wt. %, more preferably at least 10 wt. % and even more preferably of at least 14 wt. %. Besides, the DINP absorption by the particles (III) is generally not exceeding 26 wt. %.

The inventors have found advantageous that in particles (III) said at least one vinylidene chloride polymer may be vinylidene chloride homopolymer or vinylidene chloride copolymer comprising repetitive units derived from at least one monomer generally chosen from the list consisting of vinyl chloride, acrylonitrile, acrylic acid, alkyl acrylates, methacrylic acid and alkyl methacrylates.

When the vinylidene chloride polymer is a copolymer; it is advantageously a copolymer comprising repetitive units derived from vinyl chloride or an alkyl acrylate.

When the vinylidene chloride copolymer comprises repetitive units derived from an alkyl acrylate, this alkyl acrylate is preferably butyl acrylate or methyl acrylate; more preferably it is methyl acrylate.

The above mentioned vinylidene chloride polymers suitable for the present invention are preferably obtained by free radical (co)polymerization of the corresponding (co)monomers.

The author have found advantageous that a suitable vinylidene chloride copolymer comprises, with regard to the totality of the repetitive units, at least 55% of repetitive units derived from (preferably, resulting from the free radical polymerization of) vinylidene chloride, more advantageous at least 65% and even more advantageous at least 75%. As the skilled person will understand, the percentages (%) are molar percentages.

Most preferably, the vinylidene chloride polymer is a vinylidene chloride homopolymer.

The melting point of the polymer may be determined by differential scanning calorimetry using the peak temperature of the endotherm.

The melting point of the vinylidene chloride polymer is dependent upon the composition of said polymer. Generally the melting point is ranging from 130° C. to 210° C.

When the vinylidene chloride polymer is vinylidene chloride homopolymer, the melting point is generally ranging from 165° C. to 210° C.

The particles (III) according to the invention, apart from the vinylidene chloride polymer, may comprise any other ingredients such as dispersing agent, filler, plasticizer . . . .

Generally, the content of the vinylidene chloride polymer with regard to the total weight of the particles (III) is at least 65 wt. %. It is preferably at least 75 wt. %, more preferably at least 85 wt. % and even more preferably at least 95 wt. %. Besides, the authors have found advantageous to use particles (III) essentially composed of the vinylidene chloride polymer and more advantageous to use particles composed of the vinylidene chloride polymer.

Another aspect of the invention consists of preparing precursor particles (III) suitable for the manufacture of particles (I) by carbonization. Accordingly, an object of the invention is a process for reducing the size of porous particles (IV) having macropores, said particles (IV) comprising at least one vinylidene chloride polymer having a melting point and a mean diameter, determined by laser diffraction analysis, ranging from 170 μm to 800 μm, said process comprising the steps of:
  cryogenically freezing the particles (IV) of the vinylidene chloride polymer,
  grinding the frozen particles (IV) thereby obtaining particles of reduced size.

The vinylidene chloride polymer may be vinylidene chloride homopolymer or vinylidene chloride copolymer as previously described.

The particles (IV) according to the invention, apart from the vinylidene chloride polymer, may comprise any other ingredients such as dispersing agent, filler, plasticizer . . . .

Generally, the content of the vinylidene chloride polymer with regard to the total weight of the particles (IV) is at least 65 wt. %. It is preferably at least 75 wt. %, more preferably at least 85 wt. % and even more preferably at least 95 wt. %. Besides, the authors have found advantageous to use particles (IV) essentially composed of the vinylidene chloride polymer and more advantageous to use particles composed of the vinylidene chloride polymer.

Cryogenically freezing the particles (IV) of the vinylidene chloride polymer takes generally place at a temperature below the ductile-brittle transition temperature of the vinylidene chloride polymer. The ductile-brittle transition temperature can be advantageously determined by differential scanning calorimetry.

As a matter of example, the particles (IV) may be frozen by spraying of a cryogenic fluid. The cryogenic fluid is preferably liquid helium, liquid nitrogen or mixtures thereof. It is more preferably liquid nitrogen.

Grinding of the frozen particle (IV) may be conducted in the presence or the absence of a media as previously described for the grinding of particles (II). Grinding of the frozen particles (IV) is preferably conducted in the presence of a media, more preferably in a ball mill.

As a matter of example only, good results have been obtained when IXAN® PV708, IXAN® PV919 and IXAN® PV925 vinylidene chloride copolymers, comprising vinyl chloride or methyl acrylate moieties, commercialized by Solvay Specialty Polymers have been used as porous particles (IV).

In a preferred embodiment, the obtained porous particles of reduced size are the particles (III) as previously described.

Another object of the invention, in view of preparing precursor particles for the manufacture of particles (I) by carbonization, is a process for manufacturing porous particles having macropores, said particles comprising a vinylidene chloride polymer having a melting point, said process comprising a step of free radical suspension polymerization of at least one monomer comprising vinylidene chloride in the presence of from 0.13 wt. % to 1.50 wt. %, based on the total weight of said monomer, of at least one cellulosic dispersing agent. In some preferred embodiments, the free radical suspension polymerization is conducted in the presence of from 0.15 wt. % to 1.00 wt. %, based on the total weight of said monomer, of cellulosic dispersing agent and in some more preferred embodiments in the presence of from 0.2 wt. % to 0.8 wt. % of cellulosic dispersing agent.

The polymerization medium preferably comprises at least 55 mol. % of vinylidene chloride monomer, with regard to the total mole number of monomers, more preferably at least 65% and even more preferably at least 75%.

The authors have found advantageous that the polymerization medium comprises essentially vinylidene chloride as the monomer and more advantageous that the polymerization medium comprises vinylidene chloride only as the monomer.

Generally, the cellulosic dispersing agent is selected from the list comprising methyl cellulose, ethyl cellulose, hydroxyethyl cellulose, hydroxypropyl cellulose, hydroxyethyl methyl cellulose and hydroxypropyl methyl cellulose. Preferably, it is selected from hydroxyethyl methyl cellulose and hydroxypropyl methyl cellulose and more preferably, it is hydroxypropyl methyl cellulose.

The polymerization is generally initiated by at least one organosoluble free radical initiator which is advantageously a peroxide or an azo initiator. It is preferably a peroxide initiator selected from the list comprising dialkyl peroxides, diacyl peroxides and peroxydicarbonates. It is more preferably a peroxydicarbonate and even more preferably dimyristyl peroxydicarbonate.

The free radical initiator content in the polymerization medium is generally ranging from 0.10 wt. % to 4.00 wt. % based on the total weight of the monomer. It is preferably ranging from 0.15 wt. % to 2.00 wt. % and more preferably ranging from 0.20 wt. % to 1.00 wt. %.

The polymerization temperature is generally ranging from 30° C. to 85° C., preferably ranging from 40° C. to 75° C., more preferably from 50° C. to 65° C.

The ratio between the weight water and the weight of monomer present in the polymerization medium is generally ranging from 1 to 4; preferably it is ranging from 1.2 to 2.

The resulting particles are usually containing less than 50 ppm of remaining monomer, preferably less than 30 ppm even more preferably less than 20 ppm. This low remaining monomer content can be obtained for example by a stripping process of the slurry or by any process well-known by a person skilled in the art. The particles are usually recovered from the slurry by filtration and may be washed before being dried. Drying is, as a matter of example, accomplished in a fluidized bed but any other process can be used.

The particles obtained by free radical suspension polymerization have a mean aspect ratio ranging generally from 1.4 to 1, preferably from 1.2 to 1 and even more preferably from 1.1 to 1. In a preferred embodiment, the particles comprising a vinylidene chloride polymer obtained via a process comprising a step of free radical suspension polymerization are the particles (III) as previously described.

In another preferred embodiment, the particles comprising a vinylidene chloride polymer obtained via a process comprising a step of free radical suspension polymerization are the particles (III) as previously described having a span of at most 1, preferably of at most 0.9 and more preferably of at most 0.8.

It is another object of the invention to propose a process for manufacturing porous carbonaceous particles, said process comprising:
 manufacturing porous particles by the processes described above,
 causing the pyrolysis of the vinylidene chloride polymer comprised in the so-manufactured porous particles.

It is thus an object of the invention to disclose a process for manufacturing porous carbonaceous particles by causing the pyrolysis of the vinylidene chloride polymer comprised in the porous particles (III) as previously described.

For this purpose, the particles (III) are introduced in a furnace and maintained at a temperature $T_1$ close to the boiling point of water under inert gas flow for drying.

In the case of vinylidene chloride homopolymer, the temperature $T_1$ for drying is generally of at least 60° C. It is preferably of at least 70° C., more preferably of at least 80° C. and even more preferably of at least 90° C. Besides, the temperature for drying is generally of at most 140° C., preferably of at most 135° C. and more preferably of at most 130° C.

In the case of vinylidene chloride copolymers, the temperature for drying is generally of at least 60° C. It is preferably of at least 70° C., more preferably of at least 80° C. and even more preferably of at least 90° C. Besides, the temperature for drying is generally of at most 130° C., preferably of at most 120° C. and more preferably of at most 110° C.

Then, the temperature is brought up to a temperature $T_2$ strictly above $T_{2,min}=T_m-50°$ C. and strictly below $T_{2,max}=T_m$, wherein $T_m$ is the melting point of the vinylidene chloride polymer.

In the case of vinylidene chloride homopolymer, the temperature $T_2$ is generally of at least 150° C., preferably of at least 155° C., more preferably of at least 160° C. Besides, the temperature $T_2$ is generally of at most 210° C., preferably of at most 200° C., more preferably of at most 190° C., even more preferably of at most 180° C.

In the case of vinylidene chloride copolymers, the temperature $T_2$ is generally of at least 110° C., preferably of at least 120° C., more preferably of at least 130° C. Besides, the temperature $T_2$ is generally of at most 170° C., preferably of at most 160° C. and more preferably of at most 150° C.

The particles are maintained at the temperature $T_2$ under inert gas flow, to cause the pyrolysis of the halogenated polymer.

The inert gas flow generally comprises argon, helium or mixture thereof.

For final carbonization, the particles are brought up to a temperature $T_3$ strictly above $T_{3,min}=T_m$ and strictly below $T_{3,max}=1300°$ C., wherein $T_m$ is as previously defined.

The temperature $T_3$ is generally of at least 400° C., preferably of at least 450° C., more preferably of at least 500° C. Besides, the temperature $T_3$ is generally of at most 1300° C., preferably of at most 1100° C., more preferably of at most 1000° C., even more preferably of at most 900° C.

The particles are maintained at the temperature $T_3$ under inert gas flow, to cause the pyrolysis of the halogenated polymer, thereby obtaining the porous carbonaceous particles.

In another embodiment, causing the pyrolysis of the vinylidene chloride polymer is conducted stepwise at different increasing temperatures $\theta_1 \ldots$ to $\theta_n$ wherein $\theta_1 < \ldots < \theta_n$ and $2 \leq n \leq 6$. In a preferred embodiment, n=3.

Thus, the particles are introduced in a furnace and are dried as previously described. Then, the temperature of the furnace is increased up to a temperature $\theta_1$ at a heating rate $H_1$ and is held at this temperature, under inert gas flow, for duration $D_1$. Afterwards, the temperature is optionally raised up from $\theta_1$ to the successive temperatures $\theta_n$ at the successive heating rates $H_n$ and is maintained at these temperatures, under inert gas flow, for successive durations $D_n$.

When the halogenated polymer is vinylidene chloride homopolymer, $\theta_1$ generally ranges from 110° C. to 190° C., $\theta_n$ generally ranges from 200° C. to 1300° C. Preferably, $\theta_1$ ranges from 120° C. to 170° C. and $\theta_n$ ranges from 250° C. to 900° C.

The heating rate $H_1$ generally ranges from 1° C./min to 20° C./min. The heating rate $H_n$ generally ranges from 0.1° C./min to 20° C./min.

The duration $D_1$ generally does not exceed 72 h, preferably does not exceed 48 h, more preferably does not exceed 24 h and even more preferably does not exceed 20 h. The duration $D_1$ is generally at least 0.1 h, preferably at least 0.2 h, more preferably at least 0.5 h. The duration $D_n$ generally does not exceed 30 h, preferably does not exceed 25 h, more preferably does not exceed 20 h. The duration $D_n$ is generally at least 0.1 h, preferably at least 0.2 h, more preferably at least 0.5 h.

In preferred embodiments, the manufactured porous carbonaceous particles are the particles (I) as previously described.

When the particles (III) are prepared by suspension polymerization under the conditions according to the invention, the manufactured porous carbonaceous particles are the particles (I) having a span of at most 1.5 and a mean aspect ratio ranging from 1.4 to 1.

When the particles (III) are prepared by cryogenically freezing followed by grinding of larger particles, the manufactured porous carbonaceous particles are the particles (I) having a span of at most 2.5, preferably of at most 2.2.

Porous carbonaceous particles (I) as described above owing to their relatively low mean diameter may be used to the manufacture of porous carbonaceous monoliths of low wall thickness.

Another object of the invention is a process for manufacturing a porous carbonaceous monolith comprising the steps of:

i—preparing a precursor material comprising the particles (III) as previously described, ii—forming a shaped body (S) comprising aggregates of particles (III), iii—introducing the shaped body in a furnace, iv—causing the pyrolysis of the vinylidene chloride polymer in the furnace until the porous carbonaceous monolith is obtained.

Generally, the content of the particles (III) comprising the vinylidene chloride polymer with regard to the total weight of the precursor material is at least 65 wt. %. It is preferably at least 75 wt. %, more preferably at least 85 wt. % and even more preferably at least 95 wt. %. Besides, the authors have found advantageous to use a precursor material essentially composed of the particles (III) and more advantageous to use a precursor material composed of particles (III).

In a preferred embodiment, step ii consists of forming a shaped body, by concurrently applying to the precursor material, previously introduced in a mold, a pressure P ranging from 10 to 300 bars when the vinylidene chloride polymer is a homopolymer and from 10 to 150 bars when the vinylidene chloride polymer is a copolymer, and a temperature $T_1$ ranging from $T_{1,min}$=20° C. to $T_{1,max}$=$T_m$-50° C. wherein $T_m$ is the melting point of the vinylidene chloride polymer.

At the temperature $T_1$, the pressure P is generally applied for a duration D of at least 0.5 minute, preferably of at least 1 minute, more preferably of at least 3 minutes, even more preferably of at least 5 minutes. At the temperature $T_1$, the pressure P is generally applied for a duration D not exceeding 15 minutes, preferably not exceeding 12 minutes, more preferably not exceeding 9 minutes, even more preferably not exceeding 6 minutes.

The combination of the temperature and of the pressure is an important parameter because it sets the cohesion of the shaped body. Thus, for particles (III) comprising a given vinylidene chloride polymer, at a temperature below a threshold temperature value, a poor cohesion or no cohesion of the particles is observed. Similarly at a pressure below a threshold pressure value, a poor cohesion or no cohesion of the particles is observed.

Moreover, the combination of the temperature and of the pressure determines the intra-particle macroporosity of the shaped body. Thus the intra-particle macroporosity collapses at least partially if a treatment at a too high temperature and/or at too high pressure is applied. Accordingly, an ideal combination of the temperature and of the pressure ensures a good adhesion between particles i.e. a good cohesion of the shaped body, while maintaining macroporosity inside the particles comprising the polymer close to the macroporosity of the discrete particles.

In the case of vinylidene chloride homopolymer, the temperature $T_1$ is generally of at least 20° C., preferably of at least 30° C., more preferably of at least 40° C. Besides, the temperature $T_1$ is generally of at most 170° C., preferably of at most 150° C., more preferably of at most 140° C., even more preferably of at most 130° C.

In the case of vinylidene chloride copolymers, the temperature $T_1$ is generally of at least 20° C., preferably of at least 30° C., more preferably of at least 40° C. Besides, the temperature $T_1$ is generally of at most 120° C., preferably of at most 110° C. and more preferably of at most 100° C.

The pressure P is preferably of at least 15 bars, more preferably of at least 20 bars.

Besides, in the case the vinylidene chloride polymer is a homopolymer, the pressure P may range from 10 to 200 bars, and is preferably from 10 to 150 bars. All in all, in certain mandatory or preferred embodiments of the invention, depending on whether a homopolymer or copolymer is used, the pressure P is from 10 to 150 bars. More preferably, irrespectively of whether the vinylidene chloride polymer is a homopolymer or copolymer, the pressure P is of at most 140 bars, at most 130 bars or at most 100 bars, still more preferably at most 50 bars and the most preferably at most 50 bars.

After cooling to room temperature, the shaped body is optionally unmolded before be engaged in a subsequent pyrolysis step.

The shaped body is generally a solid having a shape selected from the list consisting of circular cylinders, elliptic cylinders and polygonal prisms. Preferably, the shaped body is a circular cylinder or a rectangular prism and more preferably a rectangular prism. Generally, the shaped body has a length to width and/or a length to thickness ratio of at least 4, preferably of at least 6 and more preferably of at least 8. The length of the shaped body is generally of at least 1 cm, preferably of at least 8 cm and more preferably of at least 10 cm.

When the shaped body is a cylinder, thickness and width are equal to the diameter of the circular base. By polygonal prism is understood a prism the bases of which are polygonal. Just for the sake of example, one may advantageously consider triangular, tetragonal or hexagonal prisms.

The porous carbonaceous monolith (M) is manufactured by causing the pyrolysis of the vinylidene chloride polymer comprised in the aggregated particles (III). For this purpose, during step iii the shaped body (S) is introduced in a furnace.

Then, causing the pyrolysis of the vinylidene chloride polymer in the furnace may be conducted in a step iv which comprises:

iv$_a$—bringing the temperature of the shaped body up to a temperature T2 strictly above T2,min=Tm−50° C. and strictly below T2,max=Tm, wherein Tm is as previously defined, iv$_b$—maintaining the shaped body, at the temperature T2 under inert gas flow, to cause the pyrolysis of the vinylidene chloride polymer and the formation of an infusible char, iv$_c$—bringing the temperature of the infusible char up to a temperature T3 strictly above T3,min=Tm and strictly below T3,max=1300° C., wherein Tm is as previously defined, iv$_d$—maintaining the infusible char, at the temperature T3 under inert gas flow, to cause the pyrolysis of the vinylidene chloride polymer, thereby obtaining the porous carbonaceous monolith structure.

In the case of vinylidene chloride homopolymer, the temperature $T_2$ is generally of at least 150° C., preferably of at least 155° C., more preferably of at least 160° C. Besides, the temperature $T_2$ is generally of at most 210° C., preferably of at most 200° C., more preferably of at most 190° C., even more preferably of at most 180° C.

In the case of vinylidene chloride copolymers, the temperature $T_2$ is generally of at least 110° C., preferably of at least 120° C., more preferably of at least 130° C. Besides, the temperature $T_2$ is generally of at most 170° C., preferably of at most 160° C. and more preferably of at most 150° C.

The shaped body (S) is maintained at the temperature $T_2$ under inert gas flow, to cause the pyrolysis of the vinylidene chloride polymer.

The inert gas flow generally comprises argon, helium or mixture thereof.

Optionally, after being introduced in the furnace and before being brought to the temperature $T_2$, the shaped body is maintained at a temperature close to the boiling point of water under inert gas flow for drying.

In the case of vinylidene chloride homopolymer, the temperature for drying is generally of at least 60° C. It is preferably of at least 70° C., more preferably of at least 80° C. and even more preferably of at least 90° C. Besides, the temperature for drying is generally of at most 140° C., preferably of at most 135° C. and more preferably of at most 130° C.

In the case of vinylidene chloride copolymers, the temperature for drying is generally of at least 60° C. It is preferably of at least 70° C., more preferably of at least 80° C. and even more preferably of at least 90° C. Besides, the temperature for drying is generally of at most 130° C., preferably of at most 120° C. and more preferably of at most 110° C.

As $T_{2,max}$ is strictly below the melting point ($T_m$) of the vinylidene chloride polymer, the deshydrohalogenation occurs without observing the collapsing neither of the structure of the shaped body, nor of the macroporosity of the particle. Actually, the exposure of the shaped body at this temperature causes the formation of an infusible char which is involved in further pyrolysis at higher temperature.

For final carbonization, the infusible char is brought up to a temperature $T_3$ strictly above $T_{3,min}=T_m$ and strictly below $T_{3,max}=1300°$ C., wherein $T_m$ is as previously defined.

In the case of vinylidene chloride polymers, the temperature $T_3$ is generally of at least 400° C., preferably of at least 450° C., more preferably of at least 500° C. Besides, the temperature $T_3$ is generally of at most 1300° C., preferably of at most 1100° C., more preferably of at most 1000° C., even more preferably of at most 900° C.

The infusible char is maintained at the temperature $T_3$ under inert gas flow, to cause the pyrolysis of the vinylidene chloride polymer, thereby obtaining the porous carbonaceous monolith structure. The resulting porous carbonaceous monolith is composed of individual porous carbonaceous microbeads sintered together thus conferring enhanced mechanical properties to the structure.

The porous carbonaceous monolith (M) is generally a solid having a shape selected from the list consisting of circular cylinders, elliptic cylinders and polygonal prisms. Preferably, the monolith is a circular cylinder or a rectangular prism and more preferably a rectangular prism. Generally, the porous carbonaceous monolith has a length to width and/or a length to thickness ratio of at least 4, preferably of at least 6 and more preferably of at least 8.

The length of the carbonaceous monolith (M) is generally of at least 1 cm, preferably of at least 8 cm and more preferably of at least 10 cm.

The carbonaceous monolith (M) according to the invention is generally composed of at least 90 wt. %, preferably of at least 95 wt. %, more preferably of at least 98 wt. % and even more preferably of at least 99 wt. % of carbon.

In another embodiment, causing the pyrolysis of the vinylidene chloride polymer is conducted stepwise at different increasing temperatures $\theta_1 \ldots$ to $\theta_n$ wherein $\theta_1 < \ldots < \theta_n$ and $2 \leq n \leq 6$. In a preferred embodiment, n=3.

Thus, the shaped body (S) is introduced in a furnace and is optionally dried as previously described. Then, the temperature of the shaped body is increased up to a temperature $\theta_1$ at a heating rate $H_1$ and is held at this temperature, under inert gas flow, for duration $D_1$. Afterwards, the temperature is optionally raised up from $\theta_1$ to the successive temperatures $\theta_n$ at the successive heating rates $H_n$ and is maintained at these temperatures, under inert gas flow, for successive durations $D_n$.

When the halogenated polymer is vinylidene chloride homopolymer, $\theta_1$ generally ranges from 110° C. to 190° C., $\theta_n$ generally ranges from 200° C. to 1300° C. Preferably, $\theta_1$ ranges from 120° C. to 170° C. and $\theta_n$ ranges from 250° C. to 900° C.

The heating rate $H_1$ generally ranges from 1° C./min to 20° C./min. The heating rate $H_n$ generally ranges from 0.1° C./min to 20° C./min.

The duration $D_1$ generally does not exceed 72 h, preferably does not exceed 48 h, more preferably does not exceed 24 h and even more preferably does not exceed 20 h. The duration $D_1$ is generally at least 0.1 h, preferably at least 0.2 h, more preferably at least 0.5 h. The duration $D_n$ generally does not exceed 30 h, preferably does not exceed 25 h, more preferably does not exceed 20 h. The duration $D_n$ is generally at least 0.1 h, preferably at least 0.2 h, more preferably at least 0.5 h.

In a preferred embodiment the porous carbonaceous monolith which is obtained in step iv—is the monolith (M) as previously described.

It is also an objective of the present invention to provide a shaped body (S) comprising aggregates of particles (III) as previously described and having macropores.

The resulting shaped body comprises aggregated particles (III) presenting a porosity which is generally close to the porosity of the discrete particles (III).

The overall porosity of the shaped body can be evaluated by the absorbed amount of di-iso-nonylphtalate (DINP) expressed in wt. %. Generally the DINP absorption by the shaped body is at least 3 wt. %, preferably is at least 6 wt. %, more preferably at least 9 wt. %. Generally the DINP absorption is at most 24 wt. %, preferably is at most 20 wt. %.

The shaped body is generally a solid having a shape selected from the list consisting of circular cylinders, elliptic cylinders and polygonal prisms. Preferably, the shaped body is a circular cylinder or a rectangular prism and more preferably a rectangular prism. Generally, the shaped body has a length to width and/or a length to thickness ratio of at least 4, preferably of at least 6 and more preferably of at least 8.

The length of the shaped body is generally of at least 1 cm, preferably of at least 8 cm and more preferably of at least 10 cm.

It is also an object of the present invention to propose a porous carbonaceous monolith (M) comprising aggregates of carbonaceous particles (I) as previously described.

The porous carbonaceous monolith is generally a solid having a shape selected from the list consisting of circular cylinders, elliptic cylinders and polygonal prisms. Preferably, the monolith is a circular cylinder or a rectangular prism and more preferably a rectangular prism. Generally, the porous carbonaceous monolith has a length to width and/or a length to thickness ratio of at least 4, preferably of at least 6 and more preferably of at least 8.

The length of the carbonaceous monolith is generally of at least 1 cm, preferably of at least 8 cm and more preferably of at least 10 cm.

The carbonaceous monolith according to the invention is generally composed of at least 90 wt. %, preferably of at least 95 wt. %, more preferably of at least 98 wt. % and even more preferably of at least 99 wt. % of carbon.

The porous carbonaceous monolith (M) according to the invention is advantageously presenting an intra-particle macroporosity and an inter-particles macroporosity.

Mercury porosimetry is used to determine macroporous characteristics of the porous carbon samples. Measurements are performed as previously described for the porous carbonaceous particles (I). For this purpose, monoliths are broken down into pieces of 1 to 2 cm in order for them to fit in the dilatometers.

From the measured curves, the intra-particle (a) and the inter-particles (b) pore volumes are calculated from the total (c) pore volume (see FIG. 1). The curve showing the incremental intrusion volume in function of the pore size is used to calculate the intra-particle and the inter-particles mean pore size.

Depending on the way the precursor particles (III) comprising at least a vinylidene chloride polymer for the manufacture of particles (I) by carbonization according the invention have been manufactured, i.e. by suspension polymerization or by cryogenic grinding of particles (IV), some features concerning macroporosity of the resulting carbonaceous monoliths (M) may be slightly different.

When the precursor particles (III) are prepared by suspension polymerization under the conditions according to the invention, the intra-particle macropore volume of M, measured by Hg porosity, is generally of at least 0.02 ml/g, advantageously at least 0.03 ml/g, more advantageously at least 0.04 mug and even more advantageously at least 0.05 mug. Besides, the intra-particle macropore volume of M generally does not exceed 0.4 ml/g.

The inter-particles macropore volume of M, measured by Hg porosity, is generally of at least 0.10 mug, advantageously at least 0.20 ml/g, more advantageously at least 0.25 ml/g and even more advantageously at least 0.35 ml/g. Besides, the inter-particles macropore volume of M generally does not exceed 0.9 ml/g.

The cumulated intra and inter-particle macropore volumes or total macropore volume of M, measured by Hg porosity is generally of at least 0.12 ml/g, advantageously at least 0.20 ml/g, more advantageously at least 0.35 ml/g and even more advantageously at least 0.40 ml/g. Besides, the total macropore volume generally does not exceed 1.30 ml/g.

The intra-particle macropores have an average diameter, measured by Hg porosity, of generally at least 0.4 µm, advantageously at least 0.8 µm and more advantageously at least 1 µm. Besides, the intra-particle macropores have an average diameter which generally does not exceed 5 µm.

The inter-particle macropores have an average diameter, measured by Hg porosity, of generally at least 5 µm, advantageously at least 9 µm and more advantageously at least 12 µm. Besides, the inter-particle macropores have an average diameter which generally does not exceed 50 µm, advantageously does not exceed 45 µm and more advantageously does not exceed 40 µm.

When the particles (III) are prepared by cryogenically freezing followed by grinding of larger particles, the intra-particle macropores and the inter-particle macropores of M cannot be distinguished by Hg porosimetry probably because they have similar average diameters.

Nevertheless, the macropores have generally an average diameter, measured by Hg porosity, of at least 0.4 µm, advantageously of at least 0.6 µm and more advantageously of at least 0.8 µm. Besides, the macropores have an average diameter which generally does not exceed 8 µm.

Moreover, it is possible to measure the cumulated intra and inter-particle macropore volumes which is the total macropore volume. The total macropore volume is generally of at least 0.12 ml/g, advantageously of at least 0.20 ml/g and more advantageously of at least 0.30 ml/g. Besides, the total macropore volume generally does not exceed 1.0 ml/g.

The porosity of the porous carbonaceous monoliths according to the invention may be optionally further modified by chemical or physical activation processes well known by the person skilled in the art.

Whatever is the way the precursor particles for the manufacture of particles (I) have been made, the monolith (M) has a BET surface area of at least 800 $m^2/g$, preferably of at least 900 $m^2/g$ and more preferably of at least 1000 $m^2/g$ and has a micropore volume, measured by $N_2$ adsorption, of at least 0.30 $cm^3/g$, preferably of at least 0.35 $cm^3/g$ and more preferably of at least 0.38 $cm^3/g$. Besides, monolith (M) has a micropore volume which does not exceed 0.8 $cm^3/g$.

It is also the object of the present invention to provide a grooved carbonaceous monolith presenting a microporosity and at least one of an intra-particle macroporosity and an inter-particles macroporosity, having canals wherein gas can circulate at high speed and in a laminar flow. The grooved carbonaceous monolith may be manufactured by sculpting a carbonaceous monolith structure according to the invention. For example, straight channels may be cut along the length of a carbonaceous monolith to give individual grooved monolith.

The wall thickness of the grooved monolith is set during machining. The porous carbonaceous monolith is composed of individual porous carbonaceous particles sintered together thus conferring enhanced mechanical properties to the structure. Thus, a monolith manufactured from the particles (III) according to the invention, by the process according to the invention allows the machining of low wall thickness grooved monolith having good mechanical properties.

The manufacture of grooved monolith with low wall thickness from larger particles gives poor cohesion of individual porous carbonaceous particles and thus very low mechanical properties.

Obviously, the properties of porosity (microporosity, intra-particle and inter-particles macroporosities . . . ) of the grooved monolith are similar to the properties of the carbonaceous monolith according to the invention.

In a preferred embodiment, the individual grooved monoliths are superimposed and assembled to give a honeycomb porous carbonaceous structure presenting a microporosity and at least one of an intra-particle macroporosity and an inter-particles macroporosity. Assembling of the monoliths is made either by sticking with glue or by wrapping up with a polymer film.

In another preferred embodiment, the honeycomb porous carbonaceous structure, presenting a microporosity and at least one of an intra-particle macroporosity and an inter-particles macroporosity, is manufactured by drilling the carbonaceous monolith structure according to the present invention.

Obviously, the properties of porosity (microporosity, intra-particle and inter-particles macroporosities . . . ) of the honeycomb porous carbonaceous structure are similar to the properties of the carbonaceous monolith according to the invention.

Generally, the honeycomb structure according to the invention has a wall thickness below 1000 μm, preferably below 750 μm and more preferably below 500 μm.

This honeycomb structure, independently from the way that it is manufactured, is another object of the present invention and may be characterized in that it has a particular number of cells per square inch unit (cpsi).

Generally, the honeycomb structure according to the invention has at least 50 cpsi, preferably at least 100 cpsi, more preferably at least 150 cpsi and even more preferably at least 200 cpsi. Besides, the honeycomb structure according to the invention has advantageously at most 1200 cpsi, more advantageously at most 800 cpsi and even more advantageously at most 600 cpsi.

Another aspect of the invention is the use of the porous carbonaceous monoliths for purifying a flue gas containing $CO_2$ by selectively adsorbing $CO_2$ gas.

The dynamic and selective $CO_2$ capacity of porous carbon monoliths may be determined by experiments similar to those performed for carbonaceous particles as previously described.

Experiments on monoliths are performed on monoliths with a length of 8-12 cm and a cross section of about 1 cm². Monoliths are directly connected to the in- and outlet tubing.

The carbonaceous honeycomb monoliths according to the invention have a selective $CO_2$ capacity $Q_{CO2}$ generally of at least 15 mg/g, advantageously of at least 20 mg/g, more advantageously of at least 25 mg/g and even more advantageously of at least 27 mg/g.

The porous carbonaceous monolith structures according to the invention may be used for any gas purifications. For example, $CO_2$ may be extracted and purified from flue gas or from a gas composition comprising natural and bio gas. The porous carbonaceous monolith structures may be also used for natural and bio gas purification. They may also be used for air and water treatment applications. Finally, they may be used for catalysis applications. However, application fields are not limited to these examples.

Should the disclosure of any patents, patent applications, and publications which are incorporated herein by reference conflict with the description of the present application to the extent that it may render a term unclear, the present description shall take precedence.

EXPERIMENTAL

Small Porous Particles Comprising Vinylidene Chloride Polymer According to the Invention Obtained by Cryogenic Milling (FP1).

Figure 2:
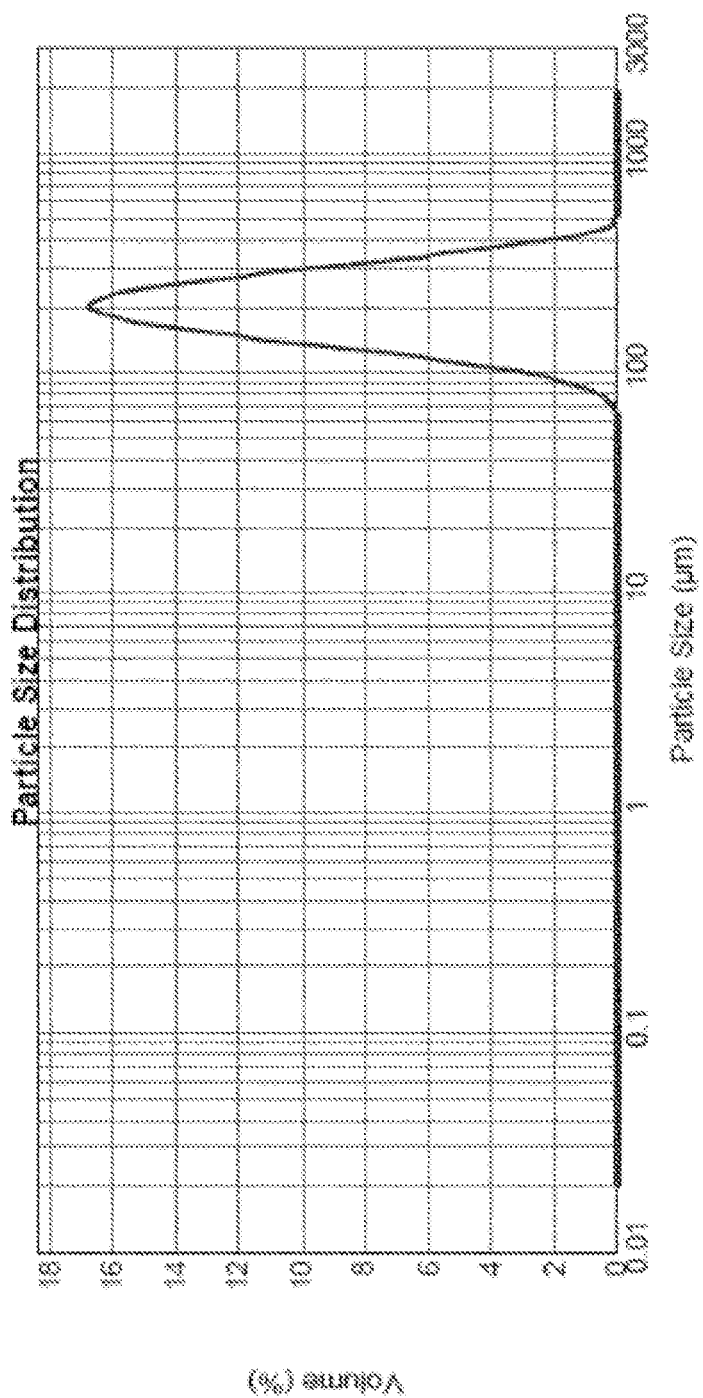
FIG. 2 is a plot showing experimental particle size distribution of IXAN® PV925 vinylidene chloride copolymer commercialized by Solvay Specialty Polymers.

IXAN® PV925 vinylidene chloride copolymer commercialized by Solvay Specialty Polymers was composed of particles having a mean diameter of 201.2 μm and a span of $0.6_5$. The particle size and the span were determined with the same equipment and procedures as previously described. The particle size was strictly comprised between 70 μm and 480 μm (see FIG. 2). The melting point of the copolymer determined as previously described was 158° C.

Figure 3:
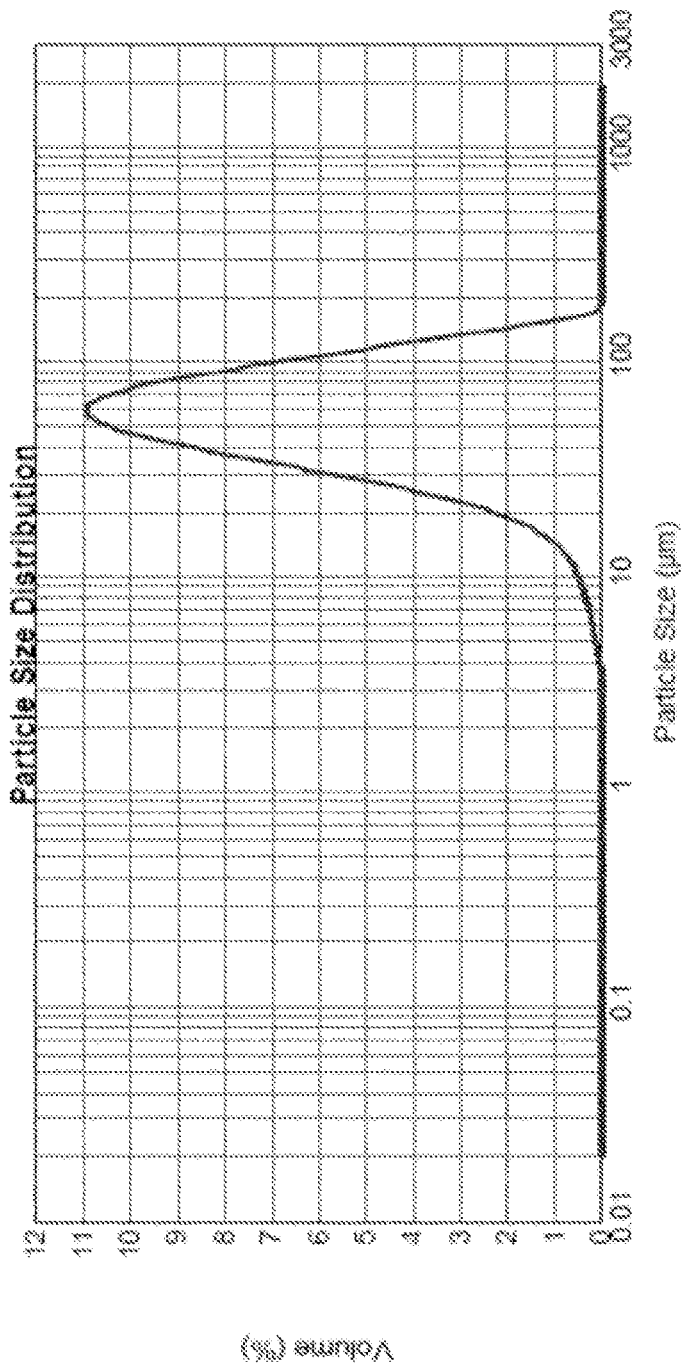
FIG. 3 is a plot showing experimental particle size distribution after milling of IXAN® PV925 vinylidene chloride copolymer commercialized by Solvay Specialty Polymers.

The said copolymer commercialized by Solvay Specialty Polymers was milled in a cryogenic milling process. The cryogenic milling process was carried out by using liquid nitrogen as the refrigerant and a ball mill. The resulting powder contained fragmented particles (FP1) having a mean diameter of 55.1 μm and a span of $1.4_5$. The particle diameter was strictly comprised between 4 μm and 175 μm, and at least 98 vol. % of said particles had a diameter, determined by laser diffraction analysis, ranging from 5 to 150 μm (see FIG. 3). The total (high pressure) pore volume and the average pore size, both measured by Hg porosity, were respectively 0.22 cm³/g and $2.9_5$ μm. 90 vol. % of the macropores of particles (III) had a diameter, measured by Hg porosimetry, ranging from 0.01 μm to 10 μm.

Small Porous Particles Comprising Vinylidene Chloride Polymer and Obtained by Suspension Polymerization According to the Invention (PVDC 1)

Vinylidene chloride homopolymer was produced in a suspension process. A 65-liter, glassed line autoclave was loaded with 36.9 kg of demineralized water and mechanical stirring was started at 130 rpm (revolutions per minute). Then, 230 g of dimyristyl peroxydicarbonate (DPDC) and 4600 cm³ of a 10 g/L aqueous solution of methyl hydroxypropyl cellulose (MHPC) as suspending agent were introduced under stirring. Afterwards, mechanical stirring was stopped and the reactor was put under vacuum. Then, 23000 g of vinylidene chloride (VDC) were loaded in the reactor and mechanical stirring was started at 235 rpm. The autoclave was then heated at 60° C. and the polymerization was allowed to proceed until the desired degree of conversion was reached. Monomer consumption was followed by monitoring the pressure drop in the autoclave. After the conversion of monomer to polymer was approximately 85%, the residual monomer was removed by stripping of the slurry formed. For this purpose, the stripping was carried out under vacuum (−0.5 bar) at a temperature of 80° C. for 8 hours. The autoclave was then cooled and drained. A slurry purified of the residual monomers was recovered, washed, filtered and dried in a fluidized bed. The resultant product (PVDC 1), was a powder, comprising particles having a mean diameter D50 of 96 μm and a span of 0.8, wherein at least 90 vol. % of said particles has a diameter, determined by laser diffraction analysis, ranging from 5 to 150 μm. The resultant product has a melt temperature of 170.6° C., a porosity measured by absorption of a DINP of 15.3%. The total pore volume and the average pore size, both measured by Hg porosity, were respectively 0.20 cm³/g and 1.3 μm. 90 vol. % of the macropores of particles (PVDC 1) had a diameter, measured by Hg porosimetry, ranging from 0.01 μm to 10 μm.

The powder had 20 ppm (part per million) residual vinylidene chloride.

Transformation of Particles Comprising a Vinylidene Chloride Polymer into Porous Carbon Particles According to the Invention (CP1 and CP2).

Particles comprising vinylidene chloride polymer obtained by cryogenic milling (FP) or by suspension polymerization (PVDC 1) according to the invention were pyrolysed in a horizontal tubular furnace under a flow of inert gas (Ar) in 3 steps:

- About 20 g of particles, in a ceramic crucible, were placed in a quartz tube, fitted in a 3 zone horizontal tubular furnace (carbolite HZS 12/900). The temperature was ramped from room temperature to 130° C. at a rate of 10° C./min and was held at that temperature for 1 h.
- In a second step the temperature was further increased with a heating rate of 1° C./min to an intermediate temperature (150° C.) and held at this temperature for 17 h.
- In the final step, the temperature was increased to the carbonization temperature (600° C.) at a heating rate of 10° C./min and held at this temperature for 1 h.

The principal features of the resulting particles are reported in table 3 (see CP1 made from FP1 and CP2 made from PVDC 1).

Small Porous Carbonaceous Particles According to the Invention Obtained by Cryogenic Milling of Commercially Available Materials (CP3).

Carbonaceous particles ATMI Brightblack commercialized by Entegris GmbH were milled via a cryogenic milling process. The cryogenic milling process was carried out by using liquid nitrogen as the refrigerant and a ball mill.

ATMI BB porous carbon microbeads were cryogenically milled, sieved and 3 different fractions were collected: particles larger than 100 μm, particles between 20 and 100 μm and particles below 20 μm.

The fraction of particles having a diameter comprised between 20 μm and 100 μm, CP3, represented 53 wt. % of the total weight of cryogenically milled ATMI BB particles. The mean diameter of these particles was 67.8 μm and their principal features are reported in table 1 (see CP3).

Principal Features of the Porous Carbon Particles According to the Invention (CP1 to CP3) and of Comparative Porous Carbon Particles(CP4 to CP7).

As previously described, the size of porous carbon particles articles were measured by laser diffraction, macroporosity was evaluated by Hg adsorption and microporosity was evaluated by N₂ adsorption.

Porous carbon particles according to the invention were obtained, as previously described, respectively by pyrolysis (CP1 and CP2) and by cryogenic milling of commercially available carbon particles (CP3). It is clear from the results reported in table 1 that carbonaceous particles combining low diameter, high macroporosity and high microporosity were obtained by the processes disclosed in the present document.

TABLE 1

Principal features of the porous carbon particles according to the Invention.

| | Carbonaceous Particles | | |
|---|---|---|---|
| | CP1 | CP2 | CP3 |
| Origin of the particle | FP1 pyrolysis | PVDC 1 pyrolysis | ATMI BB Cryogenic milling |
| Mean diameter D50 (μm) | 24.5 | 77.8 | 67.8 |
| Span | 2.2 | 1.2 | 1.1₅ |
| 5 μm < particles < 150 μm (vol. %) | 86 | 98 | 99 |
| 5 μm < particles < 120 μm (vol. %) | 82 | 94 | 90 |
| Macropores mean diameter (μm) | 7.2 | 1.1 | 1.4 |
| 0.1 μm < macropores < 10 μm (vol. %) | ≥80 | ≥80 | ≥90 |
| Macropores volume (cm³/g) | 0.83* | 0.22 | 0.24 |
| Specific surface area BET (m²/g) | 937 | 1069 | 1127 |
| Micropores volume (cm³/g) | 0.37 | 0.41 | 0.4 |

*Intra-particle and inter-particles macroporosities taken together, resulting in overestimated volume.

Commercially available carbonaceous particles and particles prepared by pyrolysis of commercially available PVDC particles CP4, CP5, CP6 and CP7 were evaluated as comparative examples. CP4 was obtained by pyrolysis of IXAN® PV925 composed of particles having a mean diameter of 201.2 μm in the same experimental conditions as for the pyrolysis of FP1 or PVDC 1. CP5 were commercially available carbon particles ATMI Brightblack commercialized by Entegris GmbH and CP7 were commercially available carbon particles YP50F commercialized by Kuraray Chemical Co., Japan. CP5 was prepared by pyrolysis of vinylidene chloride polymer comprising particles while CP7 was a steam activated carbon powder prepared from coconut. Finally, CP6 was obtained by jet milling of CP5. The principal features of these comparative examples are reported in table 2.

TABLE 2

Principal features of comparative porous carbon particles

| | Carbonaceous Particles | | | |
|---|---|---|---|---|
| | CP4 | CP5 | CP6 | CP7 |
| Origin of the particle | IXAN® PV925 pyrolysis | ATMI BB | ATMI BB jet milled | YP50F |
| Mean diameter D50 (μm) | 160 | 204.6 | 5.1 | 5.5 |
| Span | 0.8 | 0.8 | 1.2₅ | n.a. |
| 5 μm < particles < 150 μm (vol. %) | 38 | 15 | 49 | n.a. |
| 5 μm < particles < 120 μm (vol. %) | 17 | 4.5 | 49 | n.a. |
| Macropores mean diameter (μm) | 3.2 | 1.0 | n.a. | n.a. |
| 0.1 μm < macropores < 10 μm (vol. %) | ≥80 | >85 | n.a. | n.a. |
| Macropores volume (cm³/g) | 0.207 | 0.25 | n.a. | n.a. |
| Specific surface area BET (m²/g) | 955 | 1060 | 1114 | 1692 |
| Micropores volume (cm³/g) | 0.37 | 0.4 | 0.43 | 0.68 |

For CP1, CP6 and CP7, Hg porosimetry was not suitable to characterize the macroporosity. Indeed, during measurements, for particles having low mean diameter, typically 22 μm for CP1 and, a fortiori, 5.1 μm or 5.5 μm for CP6 and CP7, Hg filled the macropores inside the particles and voids between the particles in the same pressure range. Consequently, the macropores volume was over estimated for CP1 (0.83 cm$^3$/g for CP1, see table 2) while it was even not possible to carry out any measurement for CP6 and CP7 (not available results, n.a., in table 2). However, for the first sample (CP1), the macropores were clearly observed by microscopy.

Preparation of Shaped Bodies According to the Invention.

A binderless shaped body (SB1) was produced by compressing the particles FP1 below their melting point. A rectangular frame of 3 mm thickness was filled with the resin and pressed at a temperature of 40° C. and a pressure of 28.8 bars. The pressure was maintained for 6 minutes at 28.8 bars at a constant temperature of 40° C. The resulting shaped body was composed of individual polymer particles agglomerated together. After cooling the shaped body was unmolded. A binderless shaped body (SB2) was produced similarly by compressing the particles PVDC 1 at a temperature of 120° C. and a pressure of 28.8 bars.

Preparation of Shaped Bodies for Comparative Examples.

As comparative examples, a binderless shaped body (SB3) was prepared in a similar way, at a temperature of 85° C. and a pressure of 19.2 bars, using particles of IXAN® PV925 which are particles of large diameter (mean diameter=201.2 μm).

Porosity of Shaped Bodies.

The overall porosity was determined by DINP adsorption at room temperature as previously described in the core of the specification. The results reported in table 3 illustrate that the porosity of shaped body according to the invention is similar to the porosity of the shaped body of the comparative example. Accordingly it is possible to obtain shaped body with high porosity when using smaller particles.

TABLE 3

Porosity measurements onto shaped body

| | Shaped body | |
| --- | --- | --- |
| | SB2 | SB3 |
| Porosity DINP (wt. %) | 12.2 | 11.3 |

Preparation of a Porous Carbonaceous Monolith According to the Invention.

The shaped body made from cryogenically milled IXAN® PV925 (SB1) was placed in a quartz tube disposed in a 3 zone horizontal tubular furnace (carbolite HZS 12/900). The temperature was then ramped from room temperature to 130° C. at a rate of 10° C./min and was held at that temperature for 1 h in order to dry the shaped body. Then the temperature was further increased with a heating rate of 1° C./min to an intermediate temperature (i.e. 150° C.) and held at this temperature for 17 h. Afterwards, the temperature was further increased to 300° C. with a heating rate of 1° C./min and held at this temperature for 1 h. Finally, the temperature was increased to the carbonization temperature (i.e. 600° C.) at a heating rate of 10° C./min and held at this temperature for 1 h.

The monolith M1 was recovered after cooling. A monolith M2 made from the shaped body SB2 was prepared in the same way except that the intermediate temperature was set at 160° C. instead of 150° C.

Preparation of Porous Carbonaceous Monolith for Comparative Examples.

The shaped body made from IXAN® PV925 (SB3) was placed in a quartz tube disposed in a 3 zone horizontal tubular furnace (carbolite HZS 12/900). The temperature was then ramped from room temperature to 130° C. at a rate of 10° C./min and was held at that temperature for 1 h in order to dry the shaped body. Then the temperature was further increased with a heating rate of 1° C./min to an intermediate temperature (i.e. 150° C.) and held at this temperature for 17 h. Afterwards, the temperature was further increased to 300° C. with a heating rate of 1° C./min and held at this temperature for 1 h. Finally, the temperature was increased to the carbonization temperature (i.e. 600° C.) at a heating rate of 10° C./min and held at this temperature for 1 h. The monolith M3 was recovered after cooling.

Preparation of Honeycomb Monoliths

Several straight channels, of 0.8 mm wide and 0.8 mm deep, were sculpted along the length of the porous carbon monoliths using a CNC Milling Machine (Datron Electronics, CAT 3D-M5). Individual monoliths of about 1.2 cm wide and 8-12 cm long, each containing 5-7 channels, were cut out from this grooved porous carbon monolith. Afterwards, the individual monoliths were superimposed and assembled giving porous carbon honeycomb monoliths with 5 or 6 levels.

Assembling of the monoliths was made by wrapping up with a polymer film. Finally, the grooved monoliths assembled in such way resulted into honeycomb monoliths with square channels and a cell density of 200 cpsi (cells per square inch).

The wall thickness of the individual monolith was measured using a digital micrometer and the wall thickness of the grooved monolith, thus of the honeycomb monoliths, was deduced by subtracting the 0.8 mm deep of the milling cutter. The wall thickness value of the individual monolith was an average of 5 measurements made at 5 different places of said monolith, distanced from each other of 1 cm.

Figure 4:
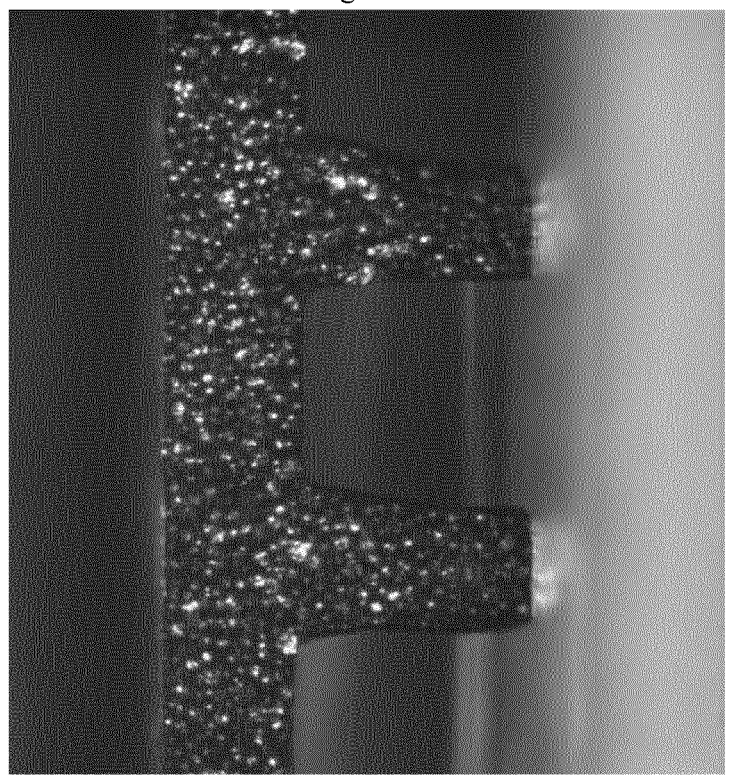
FIG. 4 is a picture of grooved monolith of low wall thicknesses prepared from PVDC 1 (mean diameter 96 µm)

FIG. 4 represents a picture of grooved monolith of low wall thicknesses prepared from PVDC 1 (mean diameter 96 μm).

Figure 5:
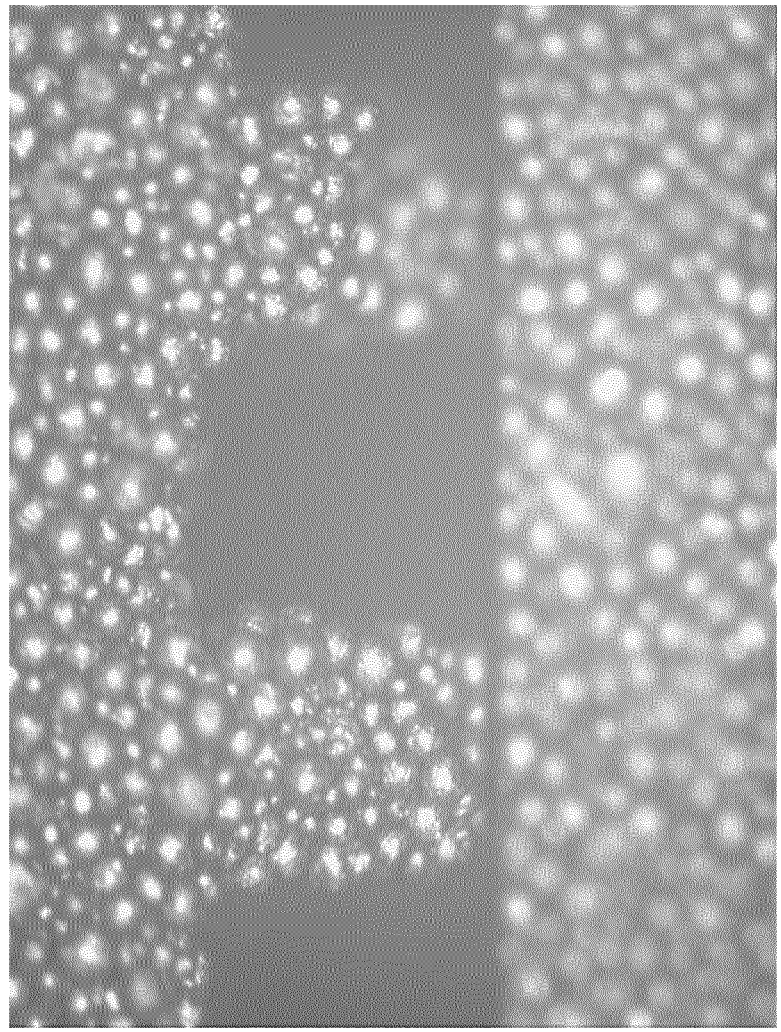
FIG. 5 is a picture of grooved monolith of large wall thicknesses prepared from IXAN® PV925 (mean diameter 201 µm).

FIG. 5 represents a picture of grooved monolith of large wall thicknesses prepared from IXAN® PV925 (mean diameter 201 μm).

Comparing the pictures of FIG. 4 and FIG. 5 reveals that the monolith made from the thinner particles had a smoother surface than the other. These pictures illustrate that the small particles were better suited than larger ones for the manufacture of grooved monoliths, having good mechanical properties and low wall thicknesses, by machining of individual monoliths.

Attempts to prepare monoliths having a wall thickness below 750 μm starting from particles having a mean diameter of 160 μm resulted in monoliths having poor cohesion and thus very low mechanical properties. These monoliths were unsuitable for any gas adsorption application.

Porosities of Porous Carbonaceous Monoliths.

Microporosity of the carbonaceous monoliths was measured by $N_2$ porosimetry while macroporosity was evaluated by Hg porosimetry, both techniques previously described in the specification. The results confirmed that the monoliths presented 3 kinds of porosity: a microporosity and a macroporosity, which was intra-particle porosities, and a macroporosity which was located between the particles, thus qualified as inter-particles macroporosity.

The results collected in table 4 clearly show that the micropore volume and the specific surface area of the particles and of monoliths according to the invention were similar to the micropore volume and the specific surface area of the microbeads and of monoliths of comparative examples. Accordingly, forming a carbonaceous monolith comprising aggregates of small carbonaceous particles is not detrimental to the microporosity.

TABLE 4

Microporosities and specific surface area of porous carbonaceous particles and monoliths

| Particles | | | Monoliths | | |
|---|---|---|---|---|---|
| Particles | Micropore volume (cm³/g) | $S_{BET}$ (m²/g) | Monoliths | Micropore volume (cm³/g) | $S_{BET}$ (m²/g) |
| CP1 | 0.37 | 937 | M1 | 0.38 | 964 |
| CP2 | 0.41 | 1069 | M2* | 0.37 | 971 |
| CP4 | 0.37 | 955 | M3** | 0.38 | 940 |

*Monoliths manufactured from shaped bodies prepared at 28.8 bars and 40° C.
**Monoliths manufactured from shaped bodies prepared at 19.2 bars and 85° C.

Moreover, the results collected in table 5 show that the total macropore volume of the monoliths according to the invention was close to the total macropore volume of the monoliths from comparative examples.

In the case of M1 which is a monolith according to the invention, it was impossible to discriminate the intra-particle macropores from the inter-particle macropores by Hg porosity measurements. However, both of them were present as revealed by the high total macropore volume measured for this monolith M1.

TABLE 5

Macroporosities of porous carbonaceous microbeads and monoliths

| Particles | | | Monoliths | | | | | |
|---|---|---|---|---|---|---|---|---|
| | Intra-particle macropore | | | Macropores volume (cm³/g) | | Macropores mean diameter (μm) | | Total macropore volume (cm³/g) |
| Particles | volume (cm³/g) | mean size (μm) | Monoliths | Intra-particle | Inter-particle | Intra-particle | Inter-particle | |
| CP1 | 0.83 | 7.2 | M1 | 0.60 | | 2.7 | | 0.63 |
| CP2 | 0.22 | 1.1 | M2 | 0.15 | 0.277 | 0.55 | 9.7 | 0.45 |
| CP4† | 0.21 | 3.2 | M3† | 0.17 | 0.57 | 1 | 33.5 | 0.75 |

†comparative examples

Selective $CO_2$ Capacity of Porous Carbonaceous Particles and Monoliths

Experiments on particles were performed using a column with a length of about 10 cm and an internal diameter of 0.6 cm, packed with 0.5 to 0.9 g of adsorbent. Experiments on monoliths were performed on monoliths with a length of 8-12 cm and a cross section of about 1 cm². Monoliths were directly connected to the in- and outlet tubing.

The selective $CO_2$ capacities, $Q_{CO2}$, are reported in table 6.

TABLE 6

Selective $CO_2$ capacities $Q_{CO2}$ of porous carbonaceous particles and monoliths

| Particles | | Monoliths | | |
|---|---|---|---|---|
| Particles | $Q_{CO2}$ (mg/g) | Monoliths | $Q_{CO2}$ (mg/g) | Wall thickness (μm) |
| CP1 | 29.4 | M1 | 30.9 | 700 |
| CP2 | 42.2 | M2 | 34.7 | 400 |
| CP3 | 40.3 | — | — | — |
| CP4† | 28.4 | M3† | 28.2 | 1000 |
| CP5† | 41.2 | — | — | — |
| — | — | CarboTech† | 11.4 | 350 |

†comparative examples

Surprisingly, the selective $CO_2$ capacity, $Q_{CO2}$, of the particles obtained by the processes according to the invention was similar to the capacity of commercially available carbonaceous particles or to the capacity of carbonaceous particles resulting from the pyrolysis of commercially available vinylidene chloride copolymer both having higher mean diameter.

Moreover, the honeycomb monoliths of the present invention had improved performances with regard to the performances of honeycomb monolith from CarboTech AC GmbH at equivalent wall thickness and equivalent cell density. This is due to the fact that the CarboTech monolith contained, next to a porous carbon adsorbent, an inert inorganic binder which actively decreased the overall adsorption capacity.

It was not possible to measure $Q_{CO2}$ neither in the case of CP6 nor in the case of CP7 because the experimental setup required a nitrogen gas flow through a column packed with the studied particles. When the size of the particles was very low, as it was the case for CP6 or CP7, the inventors noticed a plugging of the column and thus the impossibility to carry out any measurement. Finally, this observation rendered the question of the presence of macroporosity, either intra-particle or inter-particles, within those packed fine particles questionable.

Generally, the selective $CO_2$ capacities of the monoliths were slightly lower than the selective capacities of the corresponding particles (compare respectively CP1 with M1, CP2 with M2 and CP4 with M3). It is worth noting that the capacity of the monolith M1 was similar to the capacity of comparative example M3 while the capacity of the monolith M2 was higher.

These results gave evidence that the processes according to the invention allowed the manufacture of porous carbonaceous particles having low mean diameter and of monoliths having low wall thickness, typically below 1000 µm, while maintaining a high selective $CO_2$ capacity.

Effective Particles Diffusivity

The effective particle diffusivity was measured while ensuring that the system is under kinetic control as previously described. Results for the different particles are reported in table 7.

TABLE 7

Effective particles diffusivity

| Carbonaceous Particles | Carbonaceous particles according to the invention | | | Comparative examples | | | |
|---|---|---|---|---|---|---|---|
| | CP1 | CP2 | CP3 | CP4 | CP5 | CP6 | CP7 |
| Mean diameter D50 (µm) | 24.5 | 72 | 67.8 | 160 | 204.6 | 5.1 | 5.5 |
| Span | 2.2 | 1.2 | 1.15 | 0.8 | 0.8 | $1.2_5$ | n.a. |
| $CO_2$ diffusion constant ($m^2/s$) | $7.3 \cdot 10^{-12}$ | $9.7 \cdot 10^{-11}$ | $1.1 \cdot 10^{-10}$ | $6.7 \cdot 10^{-10}$ | $6.9 \cdot 10^{-10}$ | $4.7 \cdot 10^{-13}$ | $7.9 \cdot 10^{-13}$ |

The results reveal that the effective particle diffusivity was strongly affected by the macropore structure of the carbonaceous particles. On one hand, one can see from comparative examples that, for particles having an optimized macropore structure (mean diameter larger than 150 µm), the $CO_2$ diffusion constant was in the range above of $5.10^{-10}$ $m^2/s$ (see CP4 and CP5) while for particles for which the macropore structure has been reduced (particles having a diameter close to 5 µm (see CP6 and CP7)), the $CO_2$ diffusion constant was 3 orders of magnitude lower. On the other hand, the examples according to the invention (CP1 to CP3) reveal that particles having an intermediate mean diameter had surprisingly a $CO_2$ diffusion constant which was only 1 or 2 orders of magnitude lower than the $CO_2$ diffusion constant of particles having a mean diameter larger than 150 µm and that, consequently, they represent a good trade-off between size and $CO_2$ diffusion.

It is also interesting to note that particles having similar particles size manufactured starting from different raw materials, PVDC (CP6) or coconut (CP7: Kuraray YP50F), had similar $CO_2$ diffusion constant.

With diffusion experiments, the applicant has shown that the carbonaceous particles according to the invention had a mean diameter which was compatible with the manufacture of carbonaceous monolith having low wall thickness and a high $CO_2$ diffusion constant.

Moreover, the applicant has shown that the processes according to the invention were particularly well adapted for manufacturing said carbonaceous particles having high $CO_2$ diffusion constant.

Additionally, the applicant has shown that the porous particles comprising vinylidene chloride polymer according to the invention were particularly suitable for the manufacture of carbonaceous particles having high $CO_2$ diffusion constant and small diameter and, for the manufacture of monoliths having low wall thickness and high $CO_2$ diffusion constant.

The applicant has shown that the processes according to the invention were particularly well adapted for manufacturing said porous particles comprising vinylidene chloride polymer.

Among these processes, the cryogenic milling of the particles comprising vinylidene chloride polymer had the advantage over the milling in the presence of ice described in the prior art in that the span of the resulting particles was kept below 2.5. Consequently, the particles distribution was free of fine particles which might be responsible for some plugging and free of large particles which might be responsible for monoliths having poor cohesion and thus low mechanical properties. Finally the applicant has shown that the cryogenic milling of carbonaceous particles had the advantage over the jet milling of carbonaceous particles that the energy applied was better controlled and that consequently the particles were not sprayed as objects of very small size (compare CP3 with CP6). This better control of the milling process allowed the easy manufacture of particles according to the invention.

The invention claimed is:

1. A process for reducing the size of porous carbonaceous particles (II) having pores including micropores and macropores, said particles (II) having a mean diameter, determined by laser diffraction analysis, ranging from 150 µm to 800 µm, said process comprising the steps of:
   cryogenically freezing the particles (II),
   grinding the frozen particles thereby obtaining particles of reduced size.

2. A process for reducing the size of porous particles (IV) having macropores, said particles (IV) comprising at least one vinylidene chloride polymer having a melting point and a mean diameter, determined by laser diffraction analysis, ranging from 170 µm to 800 µm, said process comprising the steps of:
   cryogenically freezing the particles (IV) of the vinylidene chloride polymer,
   grinding the frozen particles (IV) thereby obtaining particles of reduced size.

3. A process for manufacturing porous particles having macropores, said particles comprising a vinylidene chloride polymer having a melting point, said process comprising a step of free radical suspension polymerization of at least one monomer comprising vinylidene chloride in the presence of from 0.13 wt. % to 1.50 wt. %, based on the total weight of said monomer, of at least one cellulosic dispersing agent
   wherein the manufactured porous particles comprising a vinylidene chloride polymer are porous particles (III) comprising at least one vinylidene chloride polymer having a melting point, said particles having macropores, a mean diameter, determined by laser diffraction analysis, ranging from 20 to 140 µm and a span of at most 2.

4. A process for manufacturing porous carbonaceous particles, said process comprising:

manufacturing porous particles by the process of claim 2, causing the pyrolysis of the vinylidene chloride polymer comprised in the so-manufactured porous particles.

5. The process according to claim 1, wherein the obtained particles of reduced size are porous carbonaceous particles (I) having pores including micropores and macropores, said porous carbonaceous particles (I) having a mean diameter, determined by laser diffraction, ranging from 15 to 100 µm.

6. The process according to claim 2, wherein the obtained porous particles are porous particles (III) comprising at least one vinylidene chloride polymer having a melting point, said particles having macropores, a mean diameter, determined by laser diffraction analysis, ranging from 20 to 140 µm and a span of at most 2.

7. The process according to claim 4, wherein said porous carbonaceous particles are porous carbonaceous particles (I) having pores including micropores and macropores, said porous carbonaceous particles (I) having a mean diameter, determined by laser diffraction, ranging from 15 to 100 µm.

\* \* \* \* \*